US 7,693,041 B2

(12) United States Patent
Joo et al.

(10) Patent No.: US 7,693,041 B2
(45) Date of Patent: *Apr. 6, 2010

(54) STFBC CODING/DECODING APPARATUS AND METHOD IN AN OFDM MOBILE COMMUNICATION SYSTEM

(75) Inventors: Pan-Yuh Joo, Seoul (KR); Dae-Eop Kang, Seoul (KR); Eun-Seok Ko, Seoul (KR); Dae-Sik Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 176 days.

This patent is subject to a terminal disclaimer.

(21) Appl. No.: 11/873,251

(22) Filed: Oct. 16, 2007

(65) Prior Publication Data

US 2008/0095039 A1    Apr. 24, 2008

Related U.S. Application Data

(63) Continuation of application No. 10/291,971, filed on Nov. 12, 2002, now Pat. No. 7,301,890.

(30) Foreign Application Priority Data

Nov. 10, 2001    (KR)    .................. 10-2001-0069994
Jan. 19, 2002    (KR)    .................. 10-2002-0003204

(51) Int. Cl.
*H04J 11/00*    (2006.01)
*H04J 1/00*    (2006.01)
*H04L 12/28*    (2006.01)
*H04L 12/56*    (2006.01)
*H04K 1/10*    (2006.01)
*H04L 27/28*    (2006.01)

(52) U.S. Cl. .................. 370/208; 370/343; 370/480; 375/260

(58) Field of Classification Search .................. 370/208, 370/343, 480; 375/260
See application file for complete search history.

(56) References Cited

U.S. PATENT DOCUMENTS 6,144,711 A      11/2000   Raleigh et al.
7,301,890 B2 *   11/2007   Joo et al. .................. 370/208
2004/0022183 A1  2/2004    Li et al.

FOREIGN PATENT DOCUMENTS

CA    2 341 808    11/2001

OTHER PUBLICATIONS

S.B. Weinstein and P.M. Ebert, "Data Transmission by Frequency Division Multiplexing Using the Discrete Fourier Transform", IEEE Trans. On Commun., vol. 19, No. 4, pp. 628-675, Oct. 1971.

* cited by examiner

*Primary Examiner*—Kevin C Harper
(74) *Attorney, Agent, or Firm*—The Farrell Law Firm, LLP

(57) ABSTRACT

A mobile communication system for modulating input data with a specific size into an OFDM (Orthogonal Frequency Division Multiplexing) symbol and transmitting the OFDM symbol through at least two different antennas. A replica generator generates replica data by cyclically-circulating the input data. An encoder generates a first antenna signal and a second antenna signal by encoding the input data and the replica data. A first IFFT (Inverse Fast Fourier Transform) block generates a first OFDM symbol by performing IFFT on the first antenna signal, and a second IFFT block generates a second OFDM symbol by performing IFFT on the second antenna signal. A first antenna transmits the first OFDM symbol, and a second antenna transmits the second OFDM symbol.

19 Claims, 13 Drawing Sheets

STFBC CODING/DECODING APPARATUS AND METHOD IN AN OFDM MOBILE COMMUNICATION SYSTEM

CROSS REFERENCE TO RELATED APPLICATIONS

This application is a continuation of an application filed in the United States Patent and Trademark Office (USPTO) on Nov. 12, 2002 now U.S. Pat. No. 7,301,890 and assigned Ser. No. 10/291,971 that claims priority under 35 U.S.C. §119 to an application entitled "STFBC Coding/Decoding Apparatus and Method in an OFDM Mobile Communication System" filed in the Korean Industrial Property Office on Nov. 10, 2001 and assigned Serial No. 2001-69994, and an application entitled "STFBC Coding/Decoding Apparatus and Method in an OFDM Mobile Communication System" filed in the Korean Industrial Property Office on Jan. 19, 2002 and assigned Serial No. 2002-3204, the contents of both of which are incorporated herein by reference.

BACKGROUND OF THE INVENTION

1. Field of the Invention

The present invention relates generally to a coding/decoding apparatus and method in an OFDM (Orthogonal Frequency Division Multiplexing) mobile communication system, and in particular, to a coding/decoding apparatus and method using an STTD (Space-Time block coding based Transmit Diversity) technique.

2. Description of the Related Art

An OFDM technique currently used for high-speed data transmission over a wire/wireless channel, a technique for transmitting data using multiple carriers, is a kind of MCM (Multi-Carrier Modulation) technique, which converts a stream of serial input symbols into parallel symbols and modulates each of the converted parallel symbols with a plurality of orthogonal subcarriers (or subchannels).

A system supporting the MCM technique, called an "MCM system," was first applied to a high-frequency radio for military use, in the late 1950's, and tests on the OFDM technique for overlapping a plurality of orthogonal subcarriers have been made since the 1970's (see S. B. Weinstein and P. M. Ebert, *Data Transmission By Frequency Division Multiplexing Using The Discrete Fourier Transform*, IEEE Trans. on Commun., vol. 19, no. 4, pp. 628-675, October 1971). However, due to the difficulty in realizing orthogonal modulation between multiple carriers, the OFDM technique was hardly applied to an actual system. However, after Weinstein et al. proposed in 1971 that OFDM modulation/demodulation could be efficiently performed using DFT (Discrete Fourier Transform), active research has been carried out on the OFDM technique. In addition, as a technique of using a guard interval and inserting a cyclic prefix guard interval becomes generally known, it has become possible to reduce bad influences on the system due to multipath and delay spread interference. Therefore, the OFDM technique has been widely applied to such digital transmission techniques as DAB (Digital Audio Broadcasting), digital television, WLAN (Wireless Local Area Network), WATM (Wireless Asynchronous Transfer Mode), and fixed BWA (Broadband Wireless Access). That is, the OFDM technique was not widely used due to its hardware complexity. However, as various digital signal processing techniques including FFT (Fast Fourier Transform) and IFFT (Inverse Fast Fourier Transform) have recently been developed, it has become possible to realize the OFDM technique. The OFDM technique, though similar to the conventional FDM (Frequency Division Multiplexing) technique, is characterized in that it has optimal transmission efficiency during high-speed data transmission by maintaining orthogonality between the multiple subcarriers. In addition, the OFDM technique, having high frequency utilization efficiency and strong resistance to multipath fading, is advantageous in that it has optimal transmission efficiency during high-speed data transmission. Further, the OFDM technique, because it overlaps frequency spectrums, has high frequency utilization efficiency and strong resistance to frequency selective fading and multipath fading, and can reduce inter-symbol interference (ISI) by utilizing a guard interval. In addition, it is possible to design an equalizer having a simple structure and strong resistance to impulse noises. Due to the advantages stated above, there is a growing tendency for the OFDM technique to be widely used for the communication systems.

Now, a transmitter and a receiver of a mobile communication system supporting the OFDM technique (hereinafter, referred to as "OFDM mobile communication system") will be described in brief.

In an OFDM transmitter, input data is modulated with subcarriers through a scrambler, an encoder, and an interleaver. Here, the transmitter provides a variety of variable rates and has a coding rate, an interleaving size and a modulation technique, which can be changed according to a data rate. Commonly, the encoder uses a coding rate of ½ and ¾, and the interleaving size for preventing a burst error is determined according to the number of coded bits per OFDM symbol (NCBPS). The modulation technique includes QPSK (Quadrature Phase Shift Keying), 8PSK (8-ary Phase Shift Keying), 16QAM (16-ary Quadrature Amplitude Modulation), and 64QAM (64-ary Quadrature Amplitude Modulation), according to the data rate. A predetermined number of pilots are added to the signal modulated with a predetermined number of subcarriers. The pilot-added signal undergoes IFFT, generating one OFDM symbol. Thereafter, a guard interval for preventing the inter-symbol interference in the multipath channel environment is inserted in the OFDM symbol, and the guard interval-inserted OFDM symbol is finally applied to an RF (Radio Frequency) processor through a symbol wave generator, and then transmitted over a channel.

In an OFDM receiver corresponding to the transmitter, a reverse operation of the operation performed by the transmitter is performed and a synchronization process is added. First, the receiver performs a process of estimating a frequency offset and a symbol offset of a received OFDM symbol by utilizing a training symbol. Thereafter, a guard interval-eliminated data symbol is restored to a predetermined number of pilot-added subcarriers through an FFT block. In addition, in order to overcome a propagation delay phenomenon on an actual wireless channel, an equalizer estimates a channel condition of a received channel signal and eliminates signal distortion on the actual wireless channel from the received channel signal. The channel estimated data through the equalizer is converted to a bit stream, and then output as final data through a deinterleaver, a decoder for error correction, and a descrambler.

Although the OFDM technique has a strong resistance to frequency selective fading, its performance is restricted. A typical improved technique proposed to overcome the restriction of performance is an OFDM mobile communication system using multiple antennas. However, in general, a receiver supporting a radio data service is restricted in its size and power, so it is not preferable for the receiver to include the multiple antennas. For this reason, an improved transmission diversity technique provides a plurality of transmission antennas to the transmitter instead of providing a plurality of reception antennas to the receiver, thus reducing complexity of the receiver and preventing performance degradation because of fading.

Among many transmission techniques developed up to now, the STTD technique has relatively less calculations and low realization complexity. In addition, the OFDM technique is the most suitable communication technique to which the STTD technique is applied, and can rapidly transmit a large amount of data while sacrificing a frequency band the least, and while overcoming multipath interference.

FIG. 1 illustrates a transmitter in a conventional OFDM mobile communication system. The transmitter illustrated in FIG. 1 is designed for an OFDM mobile communication system supporting the STTD technique.

Referring to FIG. 1, the transmitter encodes input data into coded bits at a given coding rate, and interleaves the coded bits, thus generating data 110. The generated data 110 is provided to a modulator (or QPSK/QAM mapper) 120. Although various coding techniques have been proposed, the transmitter typically employs a coding technique using a turbo code, or an error correction code. Further, the transmitter uses a coding rate of ½ and ¾. The modulator 120 modulates the input data 110 by a predetermined modulation technique, and outputs modulated symbols. Here, the modulation technique includes QPSK, 8PSK, 16QAM, and 64QAM, and each of the modulation techniques performs modulation by its unique symbol mapping techniques. It will be assumed in FIG. 1 that QPSK and QAM are used as the modulation technique. The modulated symbols output from the modulator 120 are provided to a space-time block code encoder 130.

The space-time block code encoder 130 encodes the modulated symbols with a space-time block code by mapping the modulated symbols to the space-time block code. An output signal of the space-time block code encoder 130 is provided to two transmission diversity paths. That is, the output signal of the space-time block code encoder 130 is provided to a first IFFT block 140 and a second IFFT block 150. The first and second IFFT blocks 140 and 150 each generate an OFDM symbol by performing IFFT on subcarriers encoded by the space-time block code. The OFDM symbols output from the first and second IFFT blocks 140 and 150 are provided to first and second guard interval inserters 160 and 170, respectively. The first guard interval inserter 160 and the second guard interval inserter 170 insert guard intervals in the OFDM symbols output from the first IFFT block 140 and the second IFFT block 150, respectively. Transmission of the OFDM symbol is commonly performed in a block unit. However, the OFDM symbol is affected by a previous symbol, while it is transmitted over a multipath channel. In order to prevent interference between the OFDM symbols, the guard interval is inserted between consecutive blocks. The guard interval-inserted OFDM symbols from the first and second guard interval inserters 160 and 170 are transmitted over a multipath channel through first and second RF processors 180 and 190, and first and second antennas ANT1 and ANT2.

FIG. 2 illustrates a receiver in a conventional OFDM mobile communication system. The receiver illustrated in FIG. 2 is designed for an OFDM mobile communication system supporting the STTD technique, and has a structure corresponding to the structure of the transmitter illustrated in FIG. 1.

Referring to FIG. 2, a signal transmitted from a transmitter over a multipath channel is received at a first RF processor 210 and a second RF processor 220 through a first antenna ANT1 and a second antenna ANT2, respectively. The first and second RF processors 210 and 220 down-convert the RF signals received through the first and second antennas ANT1 and ANT2 into IF (Intermediate Frequency) signals, and provide the IF signals to first and second guard interval eliminators 230 and 240, respectively. The first guard interval eliminator 230 and the second guard interval eliminator 240 eliminate guard intervals inserted into the OFDM symbols output from the first RF processor 210 and the second RF processor 220, respectively. The guard interval-eliminated OFDM symbols from the first and second guard interval eliminators 230 and 240 are provided to first and second FFT blocks 250 and 260, respectively. The first and second FFT blocks 250 and 260 generate symbols encoded by the space-time block code, through an FFT process. The symbols encoded by the space-time block code are provided to a space-time block code decoder 270, where the provided symbols are decoded by a space-time block code. The modulated symbols decoded by the space-time block code are provided to a demodulator (or QPSK/QAM demapper) 280. The demodulator 280 demodulates the decoded demodulated symbols by a demodulation technique corresponding to the modulation technique used by the transmitter, and outputs coded bits. The coded bits are output as original data 290 through deinterleaving and decoding. Since the modulator 120 in the transmitter uses the modulation techniques of QPSK and QAM, the demodulator 280 also uses demodulation techniques of QPSK and QAM.

In FIGS. 1 and 2, the transmitter and the receiver each use two antennas ANT1 and ANT2 to support the transmission diversity, by way of example. However, it would be obvious to those skilled in the art that the transmitter and the receiver can use more than two antennas.

If the OFDM mobile communication system uses N subcarriers, the signals output from the first and second FFT blocks 250 and 260 in the receiver illustrated in FIG. 2 can be represented by $$r(k)=H(k)X(k)+n(k), 0 \leq k \leq N-1 \qquad \text{Equation (1)}$$

Equation (1) can be rewritten in a determinant, as follows $$r = H \cdot X + n \qquad \text{Equation (2)}$$

In Equation (2), r denotes an N×1 reception symbol vector, X denotes an N×1 transmission symbol vector, n denotes an N×1 noise vector, and H denotes an N×N diagonal matrix representing a frequency response of a channel.

A description of the FFT blocks 250 and 260 will be separately made herein below for a case where the receiver has one antenna and another case where the receiver has a plurality of antennas, e.g., $N_R$ antennas.

(1) One Reception Antenna Used

When the receiver receives, through one antenna, a signal transmitted by a space-time block code for two transmission antennas in the transmitter, a vector of the signal transmitted through the two transmission antennas can be calculated by $$\tilde{r} = \begin{bmatrix} r_1 \\ r_2^* \end{bmatrix} = \begin{bmatrix} H_1 & H_2 \\ H_2^* & -H_1^* \end{bmatrix} \begin{bmatrix} X_1 \\ X_2 \end{bmatrix} + \begin{bmatrix} n_1 \\ n_2 \end{bmatrix} = \tilde{H} \cdot X + \tilde{n} \qquad \text{Equation (3)}$$

In Equation (3), a superscript "*" represents an operator for complex conjugating each element of the matrix. Further, $H_1$ and $H_2$ represent a frequency response of each channel, and $X_1$ and $X_2$ represent a vector of each transmission symbol. Therefore, a decoded signal is calculated by multiplying the symbol vector by Hermitian of a channel matrix $\tilde{H}$ due to orthogonality of a space-time block code, as follows $$\tilde{X} = \overline{H}^H \overline{r} = \overline{H}^H \overline{H} \overline{X} + \overline{H}^H \overline{n} \qquad \text{Equation (4)}$$

$$= \begin{bmatrix} |H_1(0)|^2 + |H_2(0)|^2 & 0 & \cdots & & \cdots & \cdots & 0 \\ 0 & \ddots & \vdots & & \vdots & \vdots & \vdots \\ \vdots & 0 & |H_1(N-1)|^2 + |H_2(N-1)|^2 & 0 & \cdots & 0 \\ 0 & \cdots & 0 & |H_1(0)|^2 + |H_2(0)|^2 & \cdots & 0 \\ 0 & \cdots & 0 & & \ddots & \ddots & 0 \\ 0 & \cdots & \cdots & & \cdots & 0 & |H_1(N-1)|^2 + |H_2(N-1)|^2 \end{bmatrix}$$

$$\begin{vmatrix} X_1 \\ X_1 \end{vmatrix} + \overline{H}^H \overline{n}$$

Therefore, the received signal, after being decoded by the space-time block code, becomes equivalent to a signal by which the sum of power of the respective channels is multiplied, thereby obtaining a second-order diversity gain.

(2) $N_R$ Reception Antennas Used

When the receiver has a plurality of antennas, signals received through the plurality of antennas are decoded by the space-time block code, and then the decoded signals are summed up. This can be expressed as $$\tilde{X} = \sum_{m=1}^{N_R} \begin{bmatrix} H_{1m} & H_{2m} \\ H_{2m}^* & -H_{1m}^* \end{bmatrix} \begin{bmatrix} r_{1m} \\ r_{2m}^* \end{bmatrix} = \qquad \text{Equation (5)}$$

$$\sum_{m=1}^{N_R} \overline{H}_m^H \overline{H}_m \overline{X} + \overline{H}_m^H \overline{n}_m$$

In Equation (5), $H_{1m}$ indicates a frequency response of a channel between a first reception antenna and an $m^{th}$ reception antenna, and $H_{2m}$ indicates a frequency response of a channel between a second reception antenna and the $m^{th}$ reception antenna. Therefore, when the receiver has $N_R$ reception antennas, the received signal, after being decoded by the space-time block code, obtains a diversity gain of $2N_R$.

As stated above, the OFDM mobile communication system is designed to overcome the inter-symbol interference caused by the wireless channel. However, the OFDM mobile communication system is not so resistive to signal attenuation due to a multipath phenomenon of the wireless channel. In order to prevent performance deterioration due to the fading channel, an OFDM mobile communication system supporting the STTD technique has been proposed.

In the proposed OFDM mobile communication system, a transmitter uses a plurality of antennas, contributing to a remarkable reduction in complexity of a receiver during system realization. However, the OFDM mobile communication system supporting the STTD technique is restricted in its performance according to the number of transmission antennas. That is, since performance of the OFDM mobile communication system supporting the STTD technique is determined according to the number of transmission antennas, it is necessary to increase the number of transmission antennas in order to increase the system performance. For example, if the number of transmission antennas is increased to 3, the system performance will be remarkably increased as compared with when the number of the transmission antennas is 2. However, in the OFDM mobile communication system supporting the STTD technique, the increase in number of the transmission antennas causes an increase in calculations and a reduction in a data rate. Therefore, in the OFDM mobile communication system supporting the STTD technique, if the number of transmission antennas is increased to 3 or more in order to improve the system performance, the system complexity is increased and the data rate is decreased undesirably.

SUMMARY OF THE INVENTION

It is, therefore, an object of the present invention to provide an apparatus and method for overcoming distortion due to a multipath fading phenomenon of a space-time block code, by OFDM (Orthogonal Frequency Division Multiplexing).

It is another object of the present invention to provide an STFBC (Space-Time Frequency Block Code) coding/decoding apparatus and method capable of efficiently using frequency diversity.

It is further another object of the present invention to provide an apparatus and method for obtaining a fourth-order diversity gain, by using two transmission antennas and one reception antenna.

It is yet another object of the present invention to provide an apparatus and method for performing every process by a linear operation in an OFDM mobile communication system supporting the STTD technique.

In accordance with a first aspect of the present invention, there is provided a transmission apparatus in a mobile communication system, which modulates input data with a specific size into an OFDM (Orthogonal Frequency Division Multiplexing) symbol and transmits the OFDM symbol through at least two different antennas. The apparatus comprises a replica generator for generating replica data by cyclically-circulating the input data; an encoder for generating a first antenna signal and a second antenna signal by encoding the input data and the replica data; a first IFFT (Inverse Fast Fourier Transform) block for generating a first OFDM symbol by performing IFFT on the first antenna signal; a second IFFT block for generating a second OFDM symbol by performing IFFT on the second antenna signal; a first antenna for transmitting the first OFDM symbol; and a second antenna for transmitting the second OFDM symbol.

In accordance with a second aspect of the present invention, there is provided a transmission method in a mobile communication system, which modulates input data with a specific size into an OFDM symbol and transmits the OFDM symbol through at least two different antennas. The method comprises generating replica data by cyclically-circulating the input data; generating a first antenna signal and a second antenna signal by encoding the input data and the replica data; generating a first OFDM symbol by performing IFFT on the first antenna signal, and transmitting the first OFDM symbol through a first antenna; and generating a second OFDM symbol by performing IFFT on the second antenna signal, and transmitting the second OFDM symbol through a second antenna.

In accordance with a third aspect of the present invention, there is provided a reception apparatus for receiving signals transmitted through transmission antennas in a mobile communication system, which modulates input data with a specific size into an OFDM symbol and transmits the OFDM symbol through at least two different transmission antennas. The apparatus comprises a reception antenna for receiving the signals transmitted through the transmission antennas; an FFT (Fast Fourier Transform) block for generating an OFDM symbol by performing FFT on the signals received through the reception antenna; a decoder for generating a first transmission antenna signal and a second transmission antenna signal by space-time block decoding the OFDM symbol; and a frequency diversity combiner for demodulating the input data by inversely cyclically-circulating the first transmission antenna signal and adding the inversely cyclically-circulated signal and the second transmission antenna signal.

In accordance with a fourth aspect of the present invention, there is provided a reception method for receiving signals transmitted through transmission antennas in a mobile communication system, which modulates input data with a specific size into an OFDM symbol and transmits the OFDM symbol through at least two different transmission antennas. The method comprises receiving the signals transmitted through the transmission antennas; generating an OFDM symbol by performing FFT on the received signals; generating a first transmission antenna signal and a second transmission antenna signal by space-time block decoding the OFDM symbol; and demodulating the input data by inversely cyclically-circulating the first transmission antenna signal and adding the inversely cyclically-circulated signal and the second transmission antenna signal.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
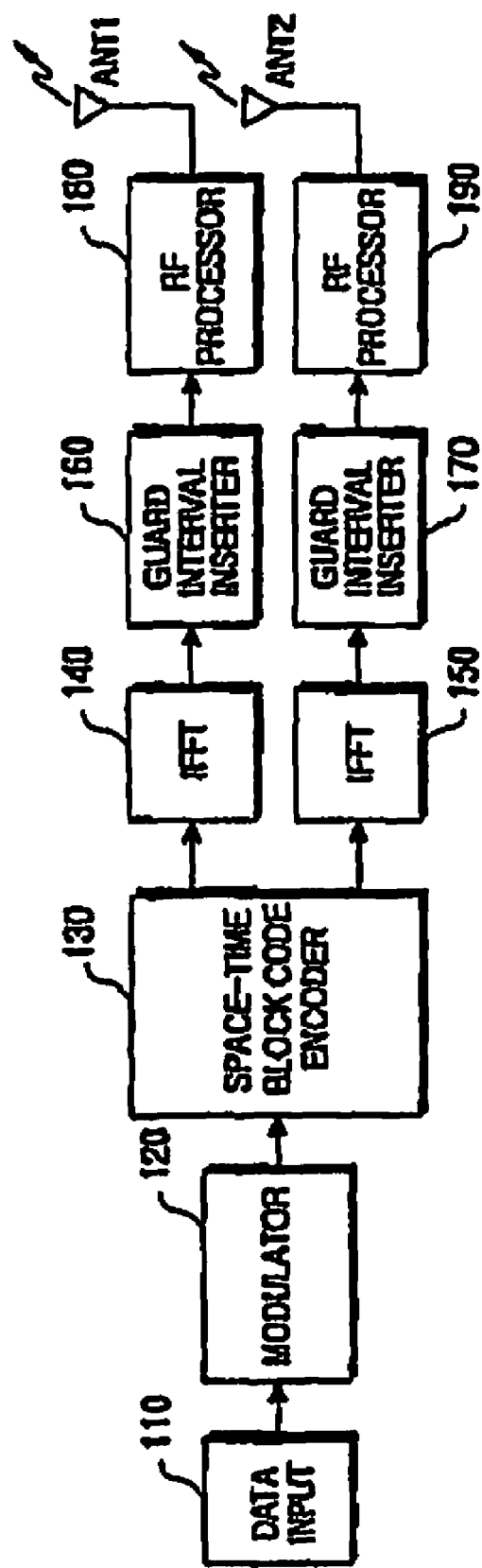
FIG. 1 illustrates a transmitter in a conventional OFDM mobile communication system.
Figure 2:
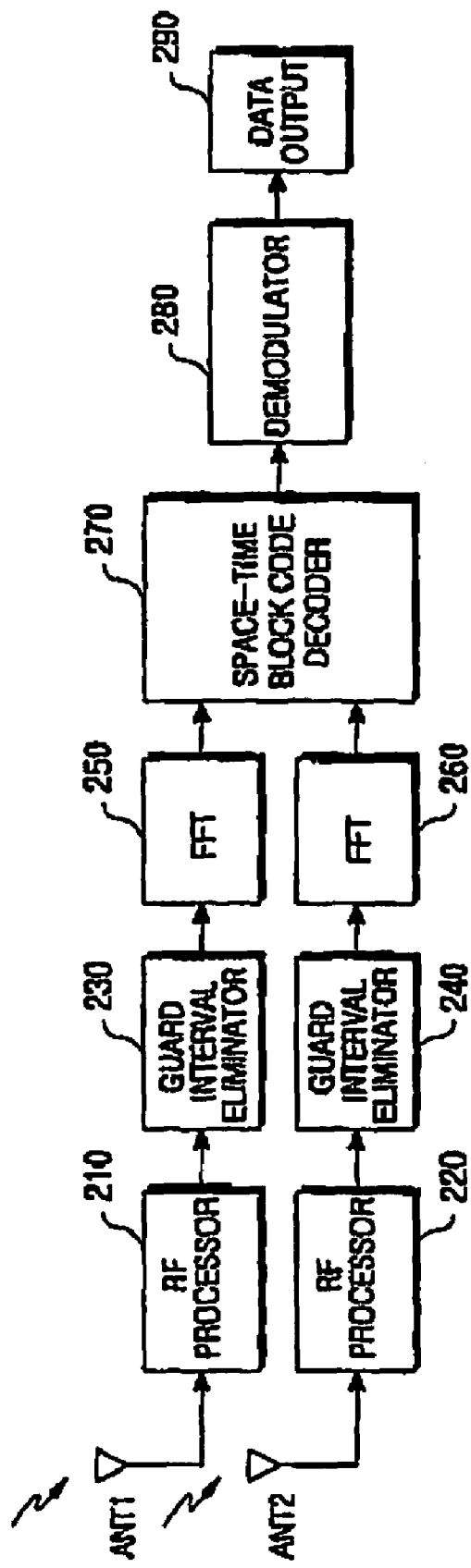
FIG. 2 illustrates a receiver in a conventional OFDM mobile communication system.

A preferred embodiment of the present invention will be described herein below with reference to the accompanying drawings. In the following description, well-known functions or constructions are not described in detail since they would obscure the invention in unnecessary detail.

In the following description, the present invention provides an apparatus for coding and decoding data by the STTD (Space-Time block coding based Transmit Diversity) technique in an OFDM (Orthogonal Frequency Division Multiplexing) mobile communication system using two transmission antennas. The STTD technique is designed to obtain both a space diversity gain and a frequency diversity gain. Therefore, with only two transmission antennas, the STTD guarantees the performance obtained using four transmission antennas. An encoder using the STTD technique is divided into two parts.

First, in order to obtain frequency diversity, the encoder includes a replica generator for receiving one OFDM symbol comprised of N subcarriers (or subchannels) and then generating two OFDM symbols each comprised of N subcarriers. Here, one of the two OFDM symbols is identical to the original OFDM symbol received at the replica generator, and the other OFDM symbol is generated by cyclically-circulating the received OFDM symbol by a predetermined distance. In the embodiment of the present invention, a distance by which the replica generator cyclically-circulates the received OFDM symbol will be referred to as a "cyclic circulation distance d," and the cyclic circulation distance d (or an amount of cyclic circulation) is calculated by $$d = \left\lfloor \frac{N}{L} \right\rfloor \cdot \left\lfloor \frac{L}{2} \right\rfloor$$

in the statistics. In another embodiment of the present invention, a receiver calculates a correlation between transmission channels, and then defines a subcarrier position where the correlation has the minimum value, as a cyclic circulation distance d of a transmitter corresponding to the receiver. A process of determining, by the receiver, a cyclic circulation distance d based on a correlation between transmission channels will be described later. Next, in order to obtain space diversity, the two OFDM symbols generated by the replica generator are mapped to a space-time block code.

The signal transmitted in this way is decoded by the receiver through a reverse operation of the operation performed by the transmitter. A decoder for an STFBC (Space-Time Frequency Block Code) is also divided into two parts.

First, a received RF signal undergoes primary decoding through a decoder for a space-time block code. The received RF signal is converted into two OFDM symbols after the primary decoding. The two OFDM symbols correspond to the OFDM symbols output from the replica generator in the transmitter. Therefore, a received OFDM symbol corresponding to the OFDM symbol transmitted by the transmitter after being cyclically-circulated among the two OFDM symbols, is inversely cyclically-circulated at the receiver by the cyclic circulation distance d used by the transmitter. Thereafter, the inversely cyclically-circulated OFDM symbol is added to (or combined with) the other OFDM symbol. The combined OFDM symbol is defined as the nearest signal based on channel information, thus completing the decoding process.

The STFBC, after being subject to the reception and transmission processes, obtains a second-order space diversity gain and a second-order frequency diversity gain. In addition, since both coding and decoding process are linearly performed, a simple operation is required. Further, even when a receiver calculates a correlation between transmission channels, defines a subcarrier position where the correlation has the minimum value as a cyclic circulation distance d, and feeds back the cyclic circulation distance d to a transmitter corresponding to the receiver, the STFBC obtains a second-order space diversity gain and a second-order frequency diversity gain. A method of determining the cyclic circulation distance d based on the correlation will be described later. In addition, since both the coding and decoding processes are linearly performed, a simple operation is required.

1. Covariance Matrix of a Channel in an OFDM System

An impulse response of a frequency selective fading channel having L multiple paths is modeled with an FIR (Finite Impulse Response) filter having L taps. This can be represented by $$g(t) = \sum_{i=0}^{L-1} h(i)\delta(t - \tau_i)$$

Equation (6)

In Equation (6), h(i) denotes an attenuation coefficient of a channel impulse response on an $i^{th}$ path, and $\tau_i$ denotes a delay time on the $i^{th}$ path. Since a channel is modeled with the FIR filter, the $\tau_i$ is equal to a sampling gap. In a system using multiple antennas, each channel coefficient h(i) is modeled with an independent complex Gaussian random variable having an average of zero. Therefore, amplitude of each channel tap constitutes Rayleigh distribution or Rician distribution, and a phase of each channel tap constitutes uniform distribution. In addition, it can be assumed that a power delay profile of a channel is uniform or has exponential distribution.

If the power delay profile of a channel is uniform in the OFDM mobile communication system, a frequency response of a channel corresponding to a $k^{th}$ subcarrier of an OFDM symbol that underwent FFT in the receiver can be expressed as $$H(k) = \sum_{i=0}^{L-1} h(i)e^{-j2\pi ki/N}, \quad 0 \le k \le N-1$$

Equation (7)

In Equation (7), N denotes the total number of subcarriers for an OFDM symbol. In order to calculate a covariance matrix of a channel, a correlation between a frequency response of a channel corresponding to a $k^{th}$ subcarrier and a frequency response of a channel corresponding to a $(k+\Delta k)^{th}$ subcarrier is calculated by $$\rho_{\Delta k} = E[H(k)H^*(k + \Delta k)]$$

Equation (8)

$$= E\left[\left(\sum_{i=0}^{L-1} h(i)e^{-j2\pi ki/N}\right) \cdot \left(\sum_{i=0}^{L-1} h(i)e^{-j2\pi(k+\Delta k)i/N}\right)^*\right]$$

$$= E\left[\sum_{i=0}^{L-1} h(i)h^*(i)e^{j2\pi\Delta ki/N}\right]$$

$$= \sum_{i=0}^{L-1} \sigma_i^2 e^{j2\pi\Delta ki/N}$$

In Equation (8), coefficients of the channel taps are used to expand non-correlation characteristics by formula. In Equation (8), $\delta_i^2$ represents a variance of an $i^{th}$ channel tap coefficient and is equal to power of an $i^{th}$ path on a channel. Since the power delay profile of a channel is uniform, $\delta_i^2 = 1/L$, and the $\delta_i^2$ values of the respective paths are independent of each other. Therefore, the following equation is derived from Equation (8).

$$\rho_{\Delta k} = \frac{1}{L}\sum_{i=0}^{L-1} e^{j2\pi\Delta ki/N}$$

Equation (9)

$$= \frac{1}{L}\frac{1 - e^{j2\pi\Delta kL/N}}{1 - e^{j2\pi\Delta k/N}}$$

$$= \frac{1}{L}\frac{\sin\left(\frac{\pi\Delta kL}{N}\right)}{\sin\left(\frac{\pi\Delta k}{N}\right)}e^{j\pi\Delta k(L-1)/N}$$

A channel vector H in Equation (9) is defined as $$H = [H(0)H(1) \ldots H(N-1)]^T$$

Equation (10)

Therefore, the whole covariance matrix $C_H$ IS calculated by $$C_H = E[HH^H]$$

Equation (11)

$$= \begin{bmatrix} \rho_0 & \rho_1 & \cdots & \rho_{N-1} \\ \rho_{-1} & \rho_0 & \cdots & \rho_{N-2} \\ \vdots & \vdots & \ddots & \vdots \\ \rho_{-N+1} & \rho_{-N+2} & \cdots & \rho_0 \end{bmatrix}$$

In the matrix of Equation (11), the $\rho_{\Delta k}$ has the following characteristics in accordance with Equation (4).

First characteristic: $\rho_{-\Delta k} = \rho_{\Delta k}^*$

Second characteristic: $|\rho_{-\Delta k}| = |\rho_{\Delta k}|$

Third characteristic: $\rho_{-\Delta k} = \rho_{N-\Delta k}$

The whole covariance matrix $C_H$ is expressed as a cyclic Hermitian matrix by the first to third characteristics.

In the foregoing description, it is assumed that a power delay profile of each channel is uniform. However, when the power delay profile of each channel is not uniform, although a covariance of a channel is not circulated by simulation verification, constructing a matrix on the basis of a subcarrier position having the minimum correlation satisfies the above circulation characteristic of a subcarrier.

2. Selection of Optimal Subcarrier for Obtaining Maximum Frequency Diversity

A fundamental concept of diversity is to enable a receiver to receive replicas of a signal having the same information through independent fading channels. Therefore, in the OFDM mobile communication system, the same signal is transmitted with different subcarriers in order to obtain frequency diversity. However, in order to obtain a maximum diversity gain, replicas of each signal must be received through independent fading channels. Therefore, in order to acquire the maximum frequency diversity gain, the OFDM mobile communication system detects subcarriers non-correlating with each other and then transmits the replicas through the detected subcarriers.

In addition, the complex Gaussian random variable, though it passes through FFT, has a constant characteristic. The reason is because the FFT is a linear function. Therefore, a frequency response H(k) of a channel is modeled with a complex Gaussian random variable having an average of zero and single distribution. Thus, if two Gaussian random variables are non-correlating due to the Gaussian distribution characteristic, the two random variables are independent of each other. For example, if a channel $H(k_2)$ for a $k_2^{th}$ subcarrier is non-correlating with a channel $H(k_1)$ for a $k_1^{th}$ subcarrier is searched, the two channels are independent of each other.

A correlation between a channel $H(k_1)$ for a $k_1^{th}$ subcarrier and a channel $H(k_2)$ for a $k_2^{th}$ subcarrier is defined as $$\rho_{k_1 k_2} = E[H(k_1)H^*(k_2)] \qquad \text{Equation (12)}$$

$$= \frac{1}{L} \frac{\sin\left(\frac{\pi(k_2-k_1)L}{N}\right)}{\sin\left(\frac{\pi(k_2-k_1)}{N}\right)} e^{j\pi(k_2-k_1)(L-1)/N}$$

In Equation (12), for non-correlation between the two channels, a condition of $\rho_{k_1 k_2}=0$ must be satisfied. Therefore, in order to satisfy this condition, Equation (12) should satisfy Equation (13) below.

$$\sin\left(\frac{\pi \Delta k_{12} L}{N}\right) = 0 \qquad \text{Equation (13)}$$

In Equation (13), $\Delta k_{12}=k_2-k_1$, and $\Delta k_{12} \neq 0$. As illustrated in Equation (13), the two independent channels are given as a function of a distance between two subcarriers. Therefore, a general solution of Equation (13) becomes $$\Delta k_{12} = \frac{mN}{L} \qquad \text{Equation (14)}$$

In Equation (14), m is an integer excluding 0. However, since $\Delta k_{12}$ is restricted as illustrated in Equation (13), the m is also restricted. However, it is possible to set $k_1$ to 0 ($k_1=0$) while maintaining universality. Then, since $1 \leq \Delta k_{12} \leq N-1$, the following relationship is given $$\frac{L}{N}\pi \leq \frac{\pi \Delta k_{12} L}{N} \leq L\pi - \frac{L}{N}\pi \qquad \text{Equation (15)}$$

Equation (15), if it is applied to Equation (14), is rewritten as $$\frac{L}{N} \leq m \leq L - \frac{L}{N} \qquad \text{Equation (16)}$$

In Equation (16), m is an integer, and L and N are natural numbers, so the m has a range of $1 \leq m \leq L-1$.

Therefore, the number of subcarriers having non-correlation with a $0^{th}$ subcarrier is L−1. Thus, the number of independent subcarrier channels including the $0^{th}$ subcarrier becomes L. Based on the third characteristic for the covariance matrix of a channel, the number of subcarriers independent of a $k^{th}$ subcarrier in a channel having L paths becomes L.

3. STFBC for Obtaining Maximum Frequency Diversity, Two Transmission Antennas Used When providing an STFBC (Space-Time-Frequency Block Code) according to an embodiment of the present invention, the following should be taken into consideration.

(1) maximum frequency and space diversity gains
(2) maintenance of maximum distance between all subcarriers
(3) strong correlation characteristic of a channel In order to obtain the maximum frequency space diversity, which should first be taken into consideration, the OFDM mobile communication system detects subcarriers non-correlating with each other and then transmits the replicas through the detected subcarriers. Now, correlations between a certain subcarrier and other subcarriers will be described with reference to FIG. 9.

Figure 9:
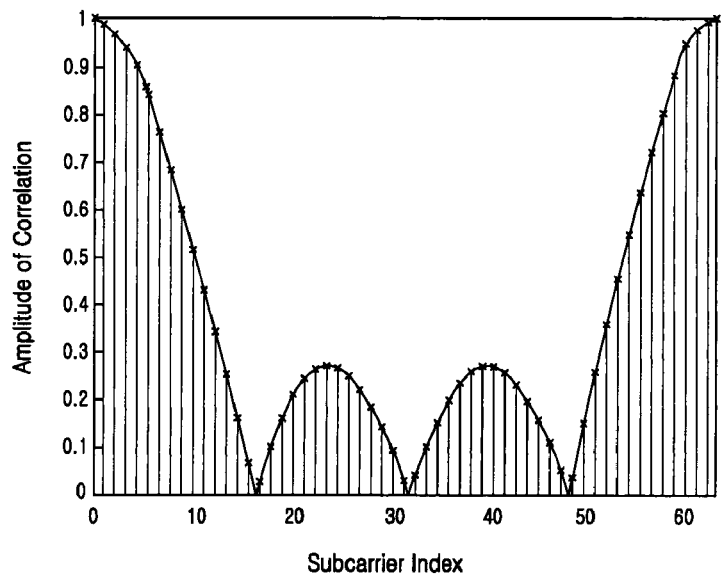
FIG. 9 illustrates correlations between a $0^{th}$ subcarrier and other subcarriers according to an embodiment of the present invention.

FIG. 9 illustrates correlations between a $0^{th}$ subcarrier and other subcarriers according to an embodiment of the present invention. Specifically, FIG. 9 is a graph illustrating amplitudes of correlations between a $0^{th}$ subcarrier and other subcarriers, wherein the channels have the same power delay profile when L=4 and N=64.

Referring to FIG. 9, it is noted that amplitude of a correlation is reduced more and more, as a subcarrier index value gets nearer to the center. The amplitudes of the correlations are symmetrical in shape according to the second characteristic of the covariance matrix of a channel. Therefore, in order to provide the strong correlation characteristic of a channel, which should be secondly taken into consideration, it is necessary to transmit replicas of a symbol through center subcarriers having less correlation with each other. In addition, since a covariance matrix of a channel is cyclically-circulated according to the third characteristic of the covariance matrix of a channel, each row in the matrix has a cyclically-circulated form of a first row (indicating correlation with the $0^{th}$ subcarrier). Therefore, independent channels for the respective subcarriers are cyclically-circulated one by one. Accordingly, an ideal proposal to satisfy the matter that should thirdly be taken into consideration is to separate the subcarriers' positions by N/2. By doing so, all subcarriers are evenly separated by N/2, thus maintaining the maximum distance. As a result, a subcarrier satisfying the matter that should first be taken into consideration while satisfying the matters that should secondly and thirdly be taken into consideration is the centermost subcarrier among the three subcarriers having a correlation of 0. Therefore, the subcarriers that are non-correlating are determined by dividing all the subcarriers by L in accordance with Equation (14), and since Δk is an integer, an optimal Δk for the three matters that should be taken into consideration is defined as $$\Delta k = d = \left\lfloor \frac{N}{L} \right\rfloor \cdot \left\lfloor \frac{L}{2} \right\rfloor \qquad \text{Equation (17)}$$

Since the correlation is cyclically-circulated according to the third characteristic of the covariance matrix of a channel, an optimal subcarrier k' for a $k^{th}$ subcarrier is calculated by $$k'=(k+d) \bmod N \qquad \text{Equation (18)}$$

In Equation (18), "mod" represents a modulo operation.

Now, with reference to FIG. 10, a description will be made of replicas' positions for obtaining the maximum frequency diversity, for example, for L=4 and N=8.

Figure 10:
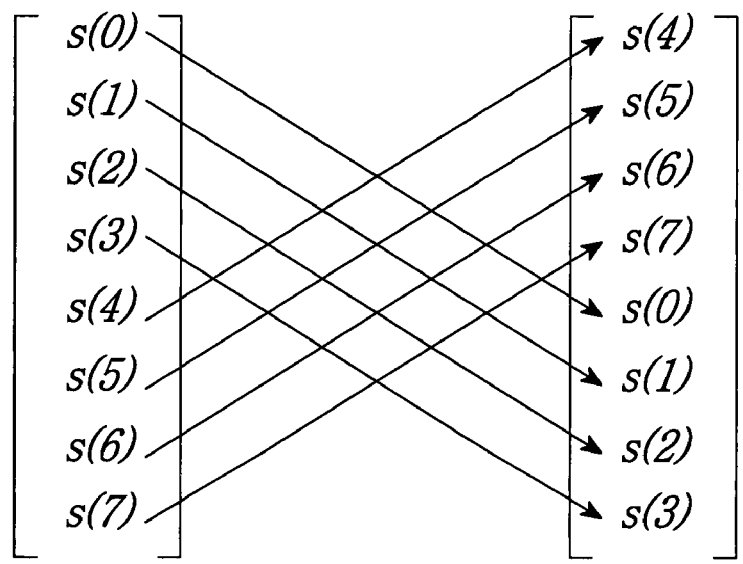
FIG. 10 illustrates replicas' positions for obtaining the maximum frequency diversity according to an embodiment of the present invention.

FIG. 10 illustrates replicas' positions for obtaining the maximum frequency diversity according to an embodiment of the present invention. Referring to FIG. 10, all subcarriers transmit replicas over subcarriers in the positions separated by N/2, as stated above. In FIG. 10, since the number of subcarriers is 8 (i.e., N=8), the replicas are carried by subcarriers separated by 8/2 (=4) subcarriers. That is, a replica of a first subcarrier is transmitted on a replica of a fifth subcarrier, and a replica of a second subcarrier is transmitted on a replica of a sixth subcarrier. In this manner, a subcarrier of an eighth subcarrier is transmitted on a subcarrier of a fourth subcarrier.

Above, a description of correlations between a $0^{th}$ subcarrier and the other subcarriers when channels have uniform power delay profiles has been described with reference to FIG. 9. Next, with reference to FIG. 14, a description will be made of correlations between subcarriers when the power delay profiles of the channels are not uniform.

Figure 14:
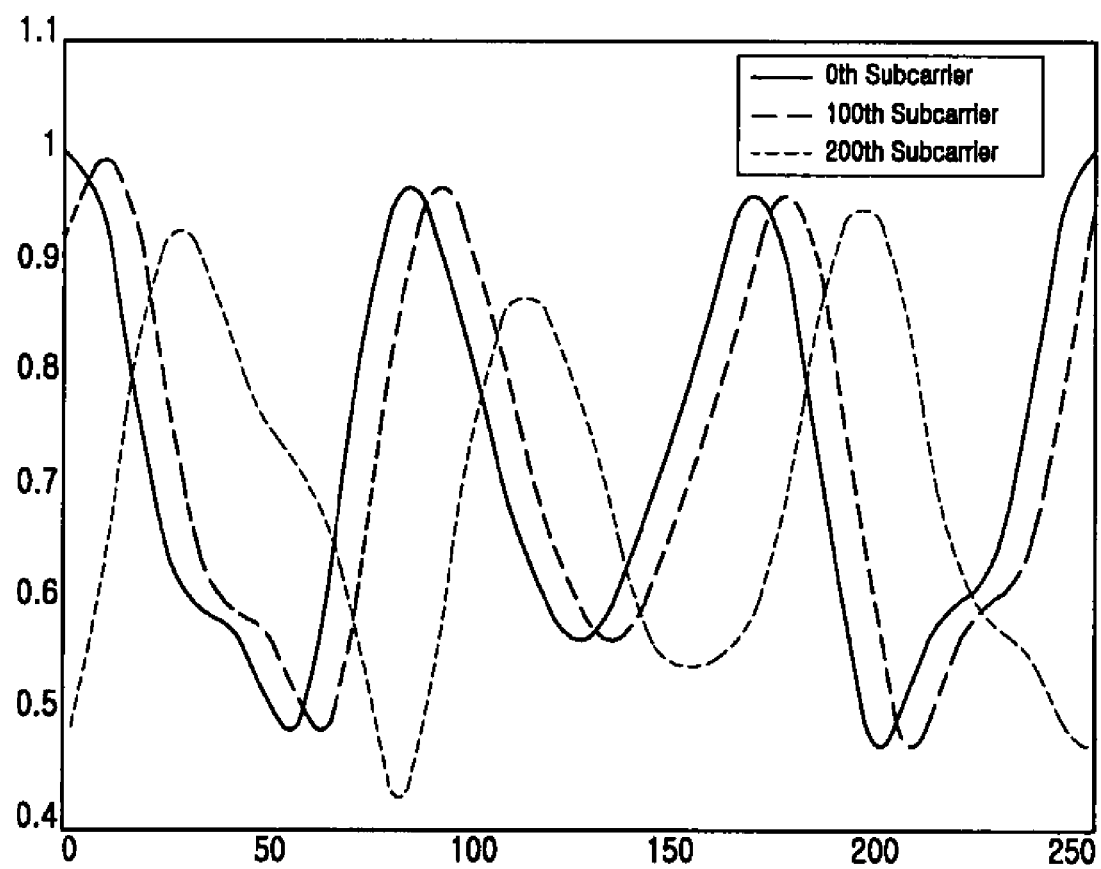
FIG. 14 illustrates correlations among $0^{th}$, $52^{nd}$, and $204^{th}$ subcarriers according to an embodiment of the present invention.

FIG. 14 illustrates correlations among $0^{th}$, $52^{nd}$, and $204^{th}$ subcarriers according to an embodiment of the present invention. Referring to FIG. 14, since the power delay profiles of the channels are not uniform, it is noted that a subcarrier position having the minimum correlation is not coincident with the center subcarrier. A difference between a position of the $0^{th}$ subcarrier and a position of a subcarrier having the minimum correlation with the $0^{th}$ subcarrier becomes a cyclic circulation distance d. Therefore, a receiver sets a position of the subcarrier having the minimum correlation with the corresponding subcarrier to the cyclic circulation distance d and feeds back the set cyclic circulation distance d to a transmitter, and the transmitter cyclically-circulates replica symbols by the cyclic circulation distance d set by the position of the subcarrier having the minimum correlation, thereby performing STTD-frequency diversity.

Now, a detailed description of the embodiment of the present invention will be described with reference to the accompanying drawings.

(1) STFBC Encoder

Figure 3:
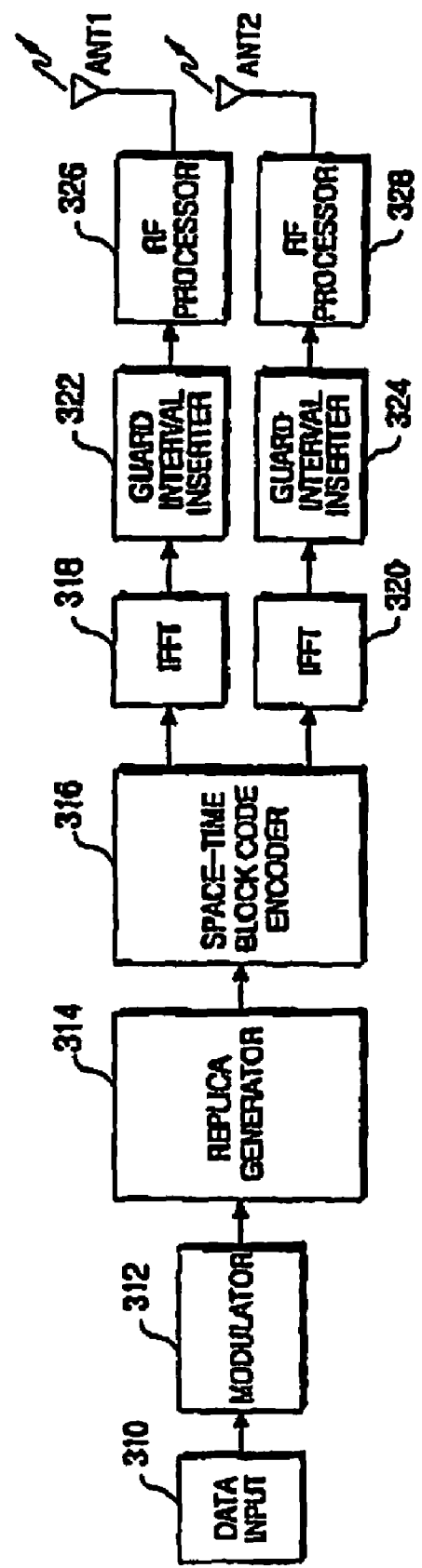
FIG. 3 illustrates a transmitter in an OFDM mobile communication system according to an embodiment of the present invention.

FIG. 3 illustrates a structure of a transmitter in an OFDM mobile communication system according to an embodiment of the present invention. Referring to FIG. 3, for an STFBC, a space-time block code is used to obtain both a maximum frequency diversity gain and a maximum space diversity gain. Now, a process of encoding an STFBC using two transmission antennas will be described herein below.

Input data 310 is provided to a modulator (or QPSK/QAM mapper) 312, and the modulator 312 buffers the input data 312 as many times as the number N of subcarriers and outputs one OFDM symbol s. The OFDM symbol s output from the modulator 312 is expressed as $$s = [s(0) \ldots s(N-1)]^T \qquad \text{Equation (19)}$$

In order to obtain the maximum frequency diversity, the transmitter generates two OFDM symbols by means of a replica generator 314, before applying the space-time block code. That is, the OFDM symbol s output from the modulator 312 is provided to the replica generator 314, and the replica generator 314 generates two different OFDM symbols. Among the two OFDM symbols output from the replica generator 314, one OFDM symbol is identical to the original OFDM symbol s, and the other OFDM symbol is generated by cyclically-circulating the OFDM symbol s by calculating a cyclic circulation distance d by Equation (17) and substituting the calculated cyclic circulation distance d into Equation (18). That is, the two OFDM symbols output from the replica generator 314 become $X_1$ and $X_2$. The OFDM symbols $X_1$ and $X_2$ are represented by $$X_1 = s = [s(0) \ldots s(N-1)]^T$$

$$X_2 = [s(N-d) \ldots s(N-1)s(0) \ldots s(N-d-1)]^T$$

Now, a process of calculating the cyclic circulation distance d will be described with reference to FIG. 7.

Figure 5:
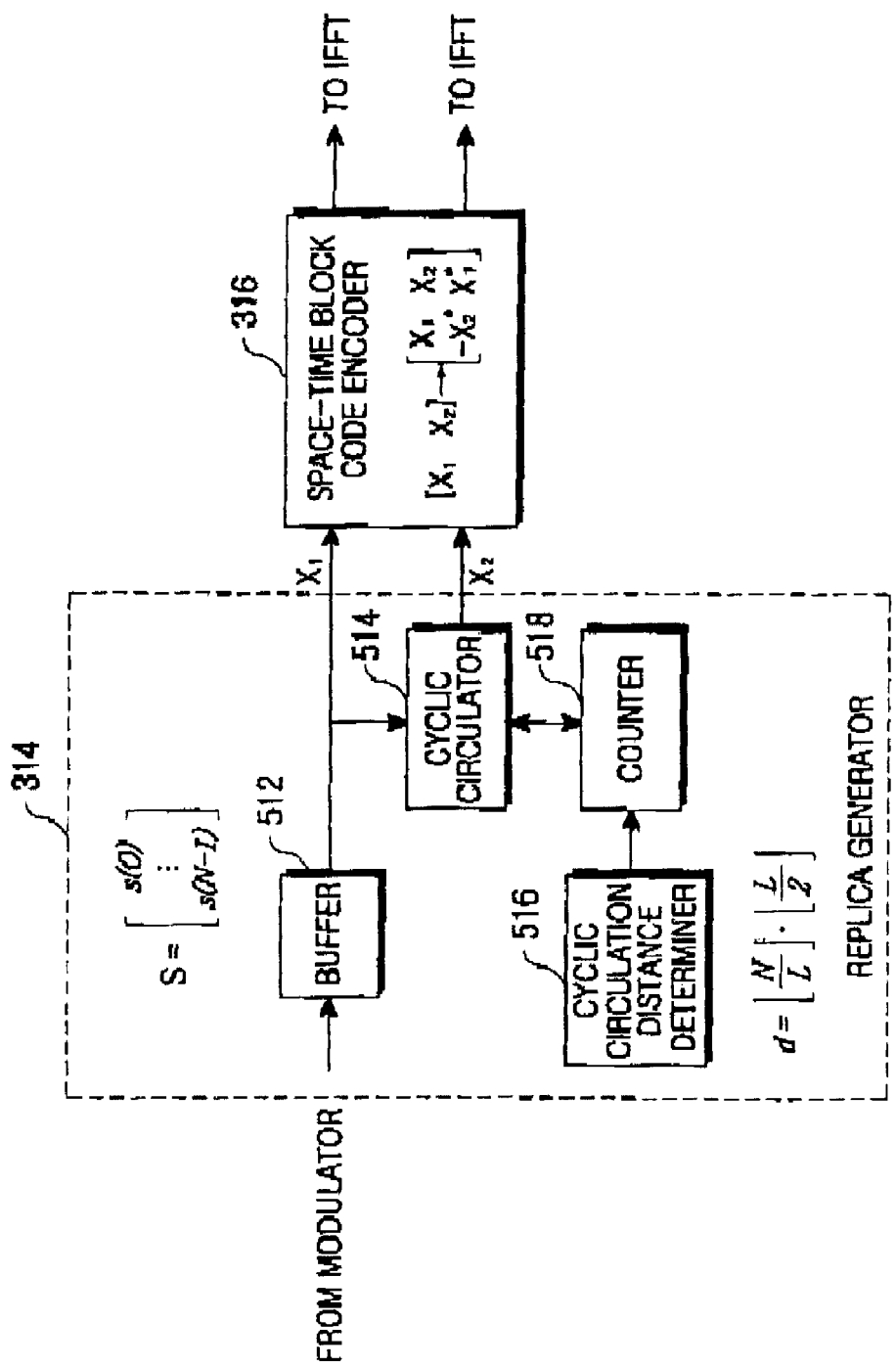
FIG. 5 illustrates a detailed structure of the replica generator illustrated in FIG. 3.
Figure 7:
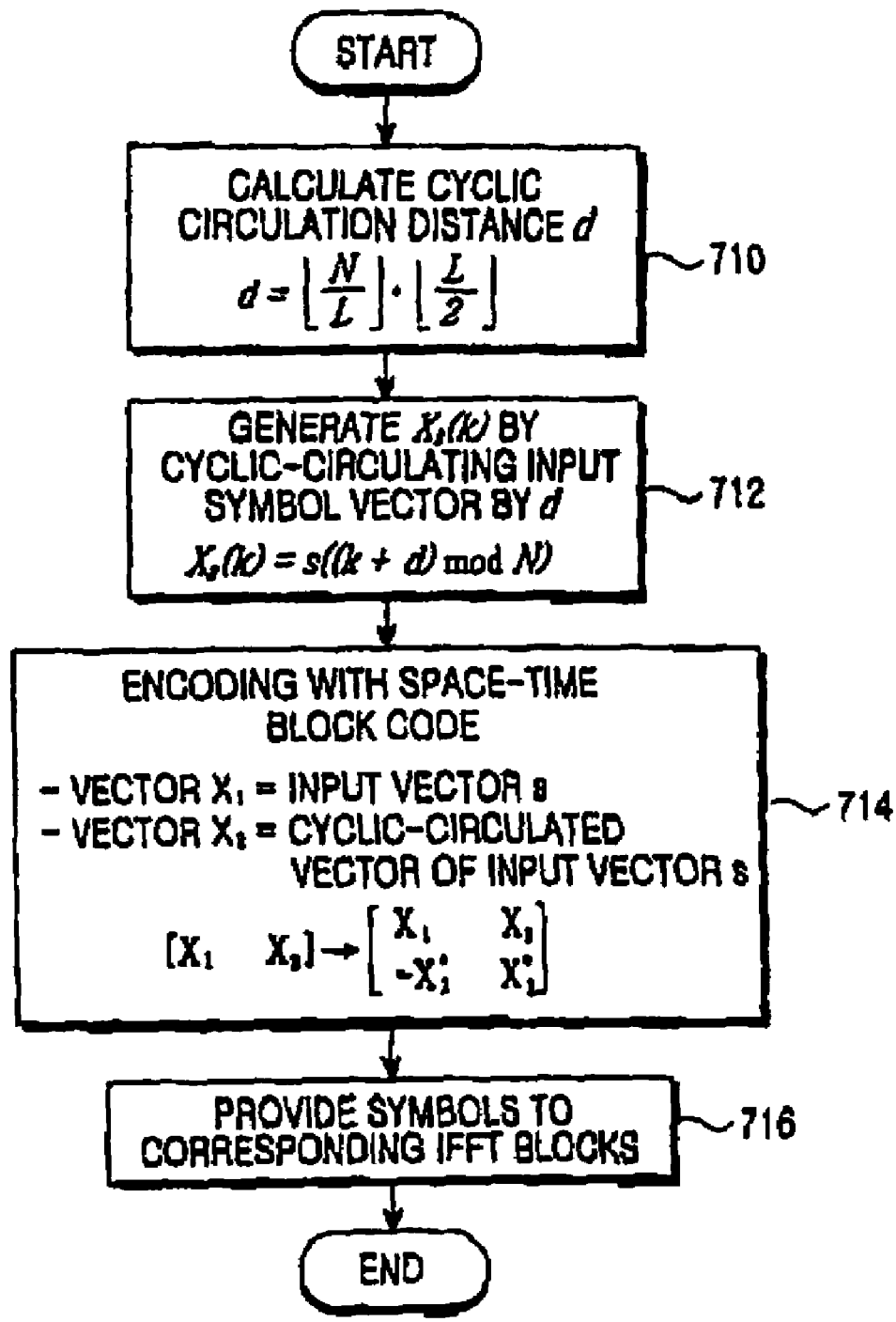
FIG. 7 illustrates an operation of a transmitter according to an embodiment of the present invention.

FIG. 7 illustrates an operation of a transmitter according to an embodiment of the present invention. Referring to FIG. 7, in step 710, the transmitter calculates a cyclic circulation distance d for the OFDM symbol s, and then proceeds to step 712. In step 712, the transmitter generates a replica by cyclically-circulating a symbol vector for the OFDM symbol s by the calculated cyclic circulation distance d, and then proceeds to step 714. Here, a detailed operation and structure for calculating the cyclic circulation distance d for the OFDM symbol s in step 710 and generating a replica for the OFDM symbol s based on the calculated cyclic circulation distance d in step 712, is illustrated in FIG. 5. However, if power delay profiles of the channels are not uniform, the transmitter calculates the cyclic circulation distance d in a different method from the method used in step 710, i.e., calculates the cyclic circulation distance d on the basis of a position of a subcarrier having the minimum correlation, and stores the calculated cyclic circulation distance d in a cyclic circulation distance determiner 516 in order to feed back the calculated cyclic circulation distance d to the transmitter. As a result, the replica generator 314 in the transmitter generates a replica by cyclically-circulating the OFDM symbol s by the cyclic circulation d.

FIG. 5 illustrates a detailed structure of the replica generator 314 of FIG. 3. Referring to FIG. 5, the OFDM symbol s output from the modulator 312 is stored in a buffer 512. The OFDM symbol s stored in the buffer 512 is provided to a space-time block code encoder 316 as an output $X_1$ of the replica generator 314. Further, the OFDM symbol s stored in the buffer 512 is provided to a cyclic circulator 514. The cyclic circulator 514 cyclically-circulates the OFDM symbol s by the cyclic circulation distance d determined by the cyclic circulation distance determiner 516, generates a second output $X_2$ of the replica generator 314, and provides the output $X_2$ to the space-time block code encoder 316. In FIG. 5, the cyclic circulation distance d determined by the cyclic circulation distance determiner 516 is provided to a counter 518, and the counter 518 counts the determined cyclic circulation distance d. The counter 518 is optional. That is, it is preferable that the cyclic circulation distance d determined by the cyclic circulation distance determiner 516 is provided to the cyclic circulator 514, to cyclically-circulate the OFDM symbol s stored in the buffer 512.

The two OFDM symbols $X_1$ and $X_2$ generated by the replica generator 314 are provided to the space-time block code encoder 316, and the space-time block code encoder 316 encodes the OFDM symbols $X_1$ and $X_2$ with a space-time block code. A process of encoding the OFDM symbols with the space-time block code is performed in step 714 of FIG. 7. If a space-time block code is applied to the two OFDM symbols $X_1$ and $X_2$ output from the replica generator 314, then the two OFDM symbols are mapped as follows.

$$\begin{bmatrix} X_1 & X_2 \\ -X_2^* & X_1^* \end{bmatrix} \qquad \text{Equation (20)}$$

The two OFDM symbols mapped by Equation (20) are provided to corresponding antennas through ordinary elements in the OFDM transmitter. That is, the two OFDM symbols output from the space-time block code encoder 316 are provided to a first IFFT (Inverse Fast Fourier Transform) block 318 and a second IFFT block 320, respectively. The first IFFT block 318 and the second IFFT block 320 perform IFFT on the OFDM symbols output from the space-time block code encoder 316, and provide their outputs to a first guard interval inserter 322 and a second guard interval inserter 324, respectively. The first guard interval inserter 322 inserts a guard interval into an output signal of the first IFFT block 318, and provides its output to a first RF processor 326. The second guard interval inserter 324 inserts a guard interval into an output signal of the second IFFT block 320, and provides its output to a second RF processor 328. The first RF processor 326 and the second RF processor 328 perform RF processing on the output signals of the first guard interval inserter 322 and the second guard interval inserter 324, and transmit over wireless channels their outputs through antennas ANT1 and ANT2, respectively.

With reference to FIG. 5, a description has been made of the structure of the replica generator for generating a replica by determining a cyclic circulation distance d when the channels have uniform power delay profiles. However, when the channels have non-uniform power delay profiles, a cyclic circulation distance d is not determined in the method described in conjunction with FIG. 5. Next, with reference to FIG. 12, a description will be made of a structure for feeding back a cyclic circulation distance d when the channels have non-uniform power delay profiles.

Figure 12:
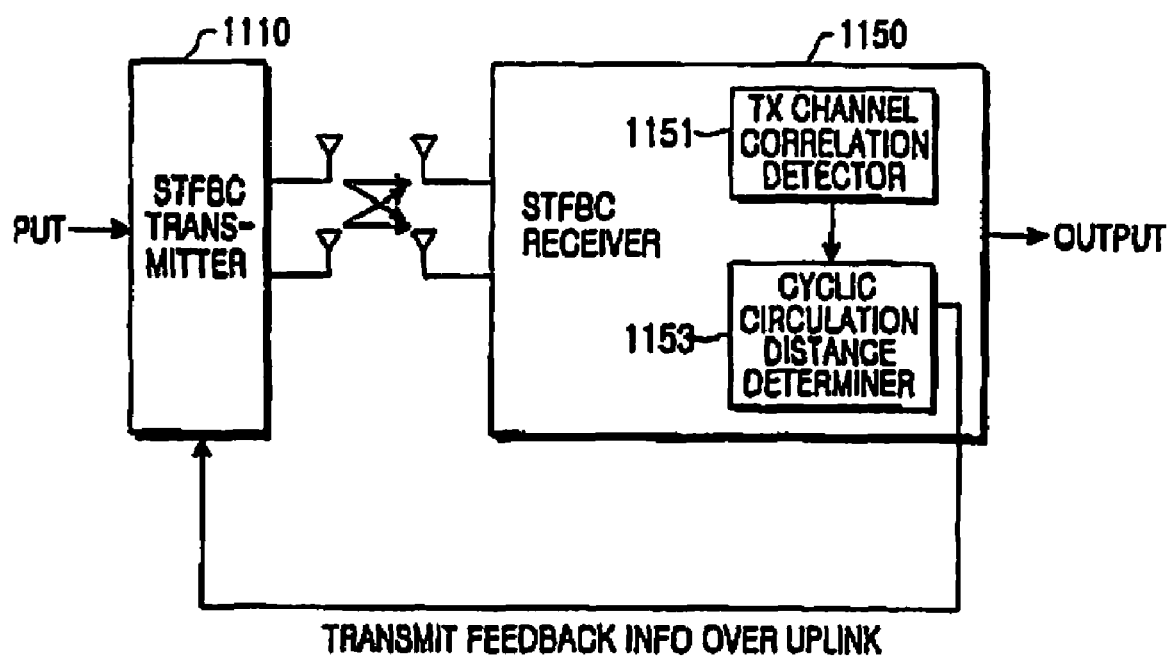
FIG. 12 schematically illustrates a structure for feeding back a cyclic circulation distance based on a measured minimum correlation of a transmission channel from a receiver to a transmitter in an OFDM mobile communication system according to an embodiment of the present invention.

FIG. 12 schematically illustrates a structure for feeding back a cyclic circulation distance based on a measured minimum correlation of a transmission channel from a receiver to a transmitter in an OFDM mobile communication system according to an embodiment of the present invention Referring to FIG. 12, if a transmitter 1110 transmits two OFDM symbols, including an original and a replica, for an input OFDM symbol s through two transmission antennas, then a receiver 1150 receives the two OFDM symbols transmitted by the transmitter 1110, through two reception antennas. The received two OFDM symbols are applied to a transmission channel correlation detector 1151, and the transmission channel correlation detector 1151 detects a correlation between subcarriers for transmission channels, using the received two OFDM symbols. The detected correlation between the subcarriers is applied to a cyclic circulation distance determiner 1153, and the cyclic circulator 1153 determines a subcarrier position where a correlation with a $0^{th}$ subcarrier between the transmission channels has a minimum value as a cyclic circulation distance d. The cyclic circulation distance determiner 1153 feeds back the determined cyclic circulation distance d to the transmitter 1110.

An operation of the transmitter 1110 illustrated in FIG. 12 will be described with reference to FIG. 13.

Figure 13:
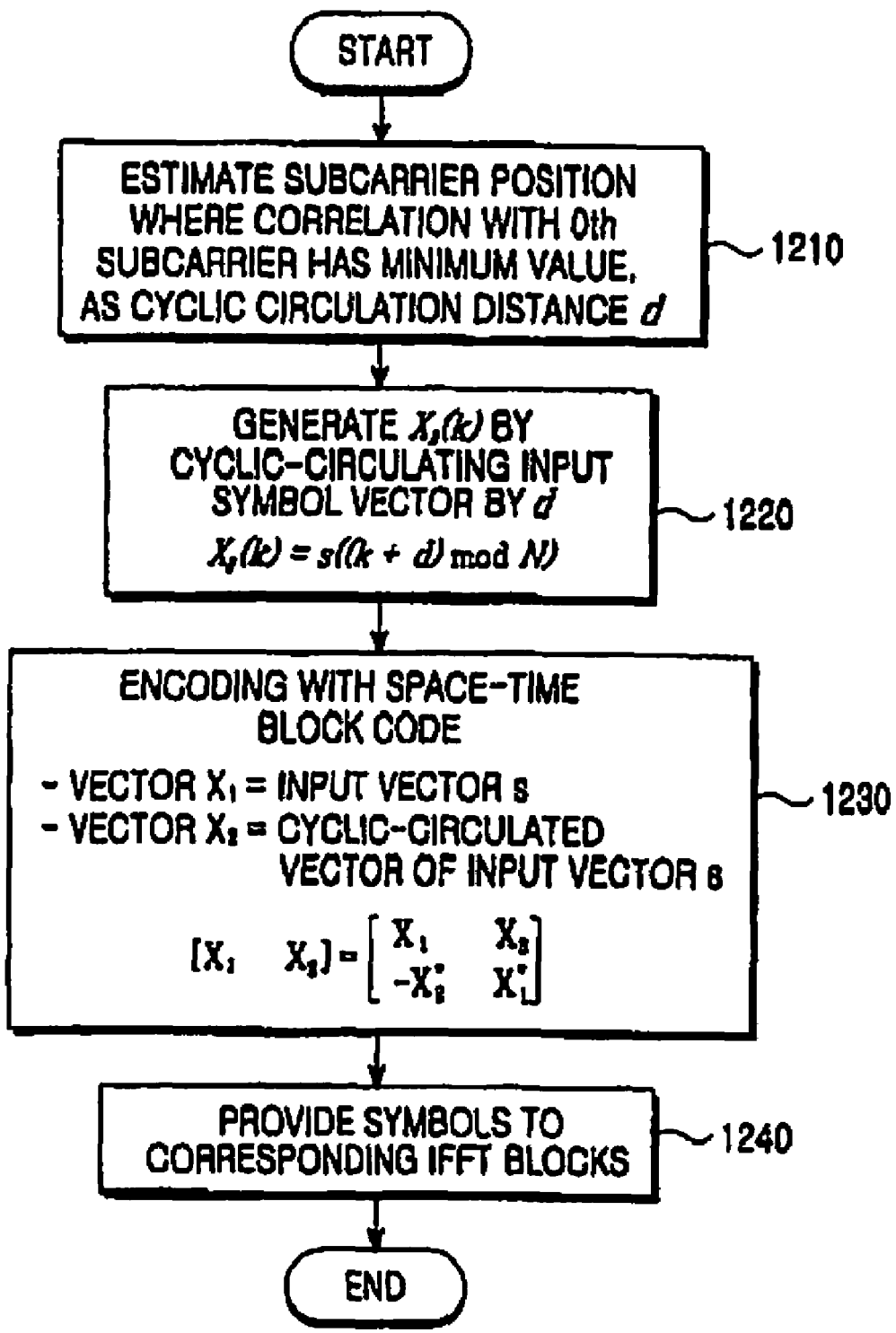
FIG. 13 illustrates an operation of a transmitter based on a feedback cyclic circulation distance d in an OFDM mobile communication system according to an embodiment of the present invention.

FIG. 13 illustrates an operation of a transmitter based on a feedback cyclic circulation distance d in an OFDM mobile communication system according to an embodiment of the present invention. Referring to FIG. 13, in step 1210, the transmitter determines a cyclic circulation distance d based on the cyclic circulation distance d fed back from the receiver, i.e., a subcarrier position where a correlation with a $0^{th}$ subcarrier between transmission channels has a minimum value, and then proceeds to step 1220. In step 1220, the transmitter generates a replica by cyclically-circulating a symbol vector of an input OFDM symbol by the determined cyclic circulation distance d, and then proceeds to step 1230. In step 1230, the transmitter encodes the original OFDM symbol and the generated replica with a space-time block code, and then proceeds to step 1240. In step 1240, the transmitter provides the two encoded OFDM symbols to IFFT blocks connected to corresponding antennas, and then ends the process. Here, the elements in the transmitter are identical in operation to the elements described in conjunction with FIG. 7, except that the cyclic circulation distance d is fed back from the receiver.

(2) STFBC Decoder

Figure 4:
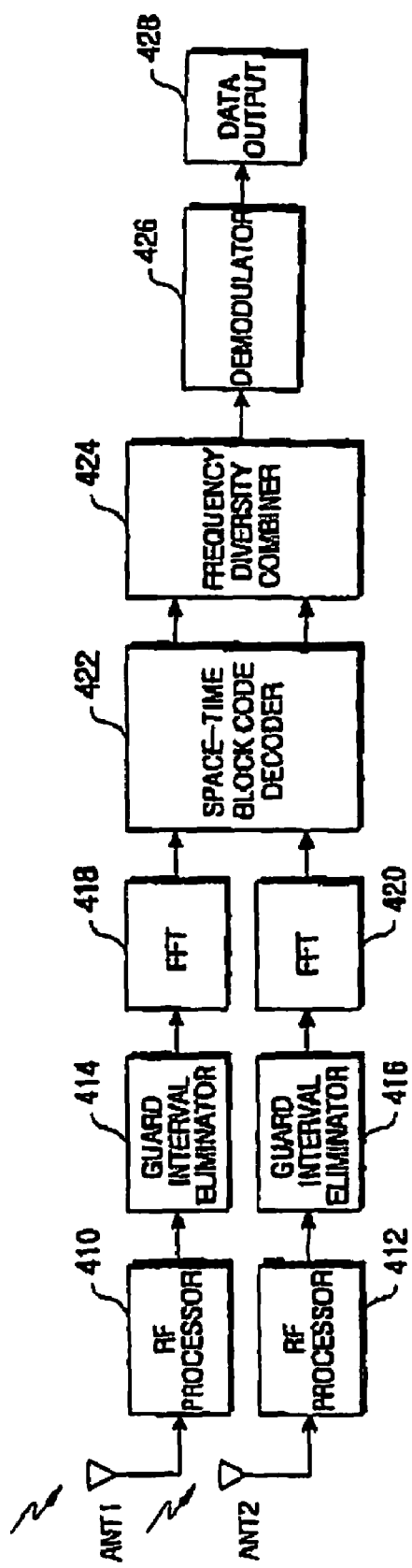
FIG. 4 illustrates a receiver in an OFDM mobile communication system according to an embodiment of the present invention.

FIG. 4 illustrates a receiver in an OFDM mobile communication system according to an embodiment of the present invention. In FIG. 4, the receiver includes 2 antennas of a first antenna ANT1 and a second antenna ANT2, a first RF processor 410 for RF-processing a signal received through the first antenna ANT1, and a second RF processor 412 for RF-processing a signal received through the second antenna ANT2. Further, the receiver includes a first guard interval eliminator 414 for eliminating a guard interval from an output signal of the first RF processor 410, a second guard interval eliminator 416 for eliminating a guard interval from an output signal of the second RF processor 412, a first FFT block 418 for performing FFT on an output signal of the first guard interval eliminator 414, and a second FFT block 420 for performing FFT on an output signal of the second guard interval eliminator 416. However, the receiver may include either one antenna or a plurality of antennas in performing the reception operation according to an embodiment of the present invention. For example, when one antenna is used, the receiver includes a first antenna ANT1, a first RF processor 414, and a first FFT block 418. However, when two antennas are used, the receiver includes a second antenna ANT2, a second RF processor 416, and a second FFT block 420 in addition to the first antenna ATN1, the first RF processor 414, and the first FFT block 418.

Referring to FIG. 4, in a receiver for an OFDM mobile communication system having N subcarriers, output signals of the FFT blocks 418 and 420 are represented by $$r = H \cdot X + n \qquad \text{Equation (21)}$$

In Equation (21), r denotes an N×1 reception symbol vector, X denotes an N×1 transmission symbol vector, n denotes an N×1 noise vector, and H denotes an N×N diagonal matrix representing a frequency response of a channel.

1) One Reception Antenna Used

Output signals of the FFT blocks 418 and 420, though they passed through a multipath fading channel in the OFDM mobile communication system, are represented by the simple product of a channel frequency response and a transmission signal in accordance with Equation (21). Therefore, signals encoded with the STFBC can be expressed as $$\bar{r} = \begin{bmatrix} r_1 \\ r_2^* \end{bmatrix} = \begin{bmatrix} H_1 & H_2 \\ H_2^* & -H_1^* \end{bmatrix}\begin{bmatrix} X_1 \\ X_2 \end{bmatrix} + \begin{bmatrix} n_1 \\ n_2 \end{bmatrix} = \overline{H} \cdot \overline{X} + \bar{n} \quad \text{Equation (22)}$$

In Equation (22), a superscript "*" represents an operator for complex conjugating each element of the matrix. Further, $H_1$ and $H_2$ represent diagonal matrixes of corresponding channel frequency responses between transmission antennas and the reception antenna, and $X_1$ and $X_2$ represent transmission symbol vectors.

Figure 6:
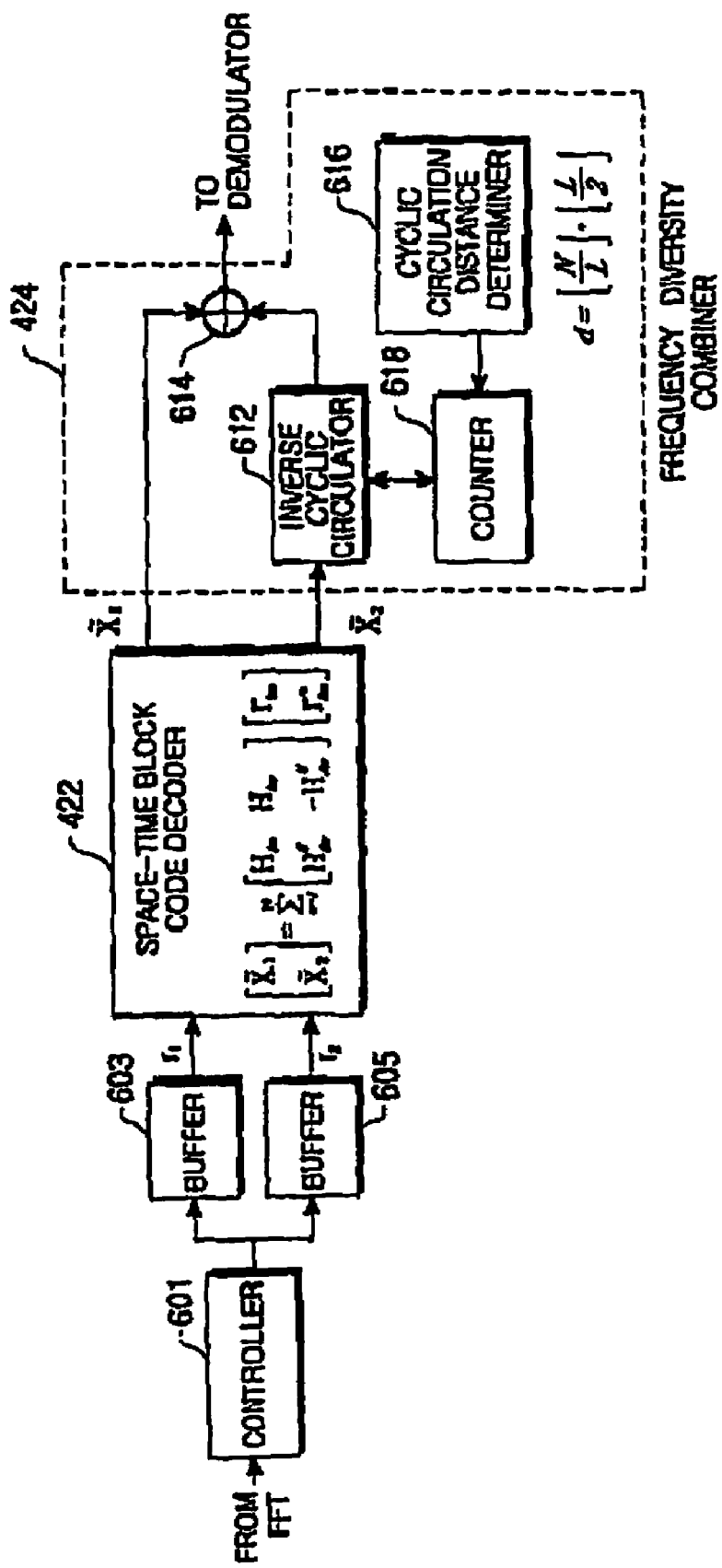
FIG. 6 illustrates a detailed structure of the frequency diversity combiner illustrated in FIG. 4.

The output signals of the FFT blocks 418 and 420 are provided to a controller 601 of FIG. 6, and the controller 601 separates the provided signals according to the paths of the multipath channel, and applies the separated signals to buffers 603 and 605. The buffers 603 and 605 store the signals separated on the time axis, and when the separated signals are stored as much as a predetermined amount, the buffers 603 and 605 provide the signals stored therein to a space-time block code decoder 422. The output signals of the buffers 603 and 605 are represented by $r_1$ and $r_2$, respectively. In the $r_1$ and $r_2$ representing the output signals of the buffers 603 and 605, subscripts 1 and 2 indicate timing indexes. The $r_1$ and $r_2$ are mixed signals of $X_1$ and $X_2$, which are separated by the transmitter due to the use of the space-time block code.

Figure 8:
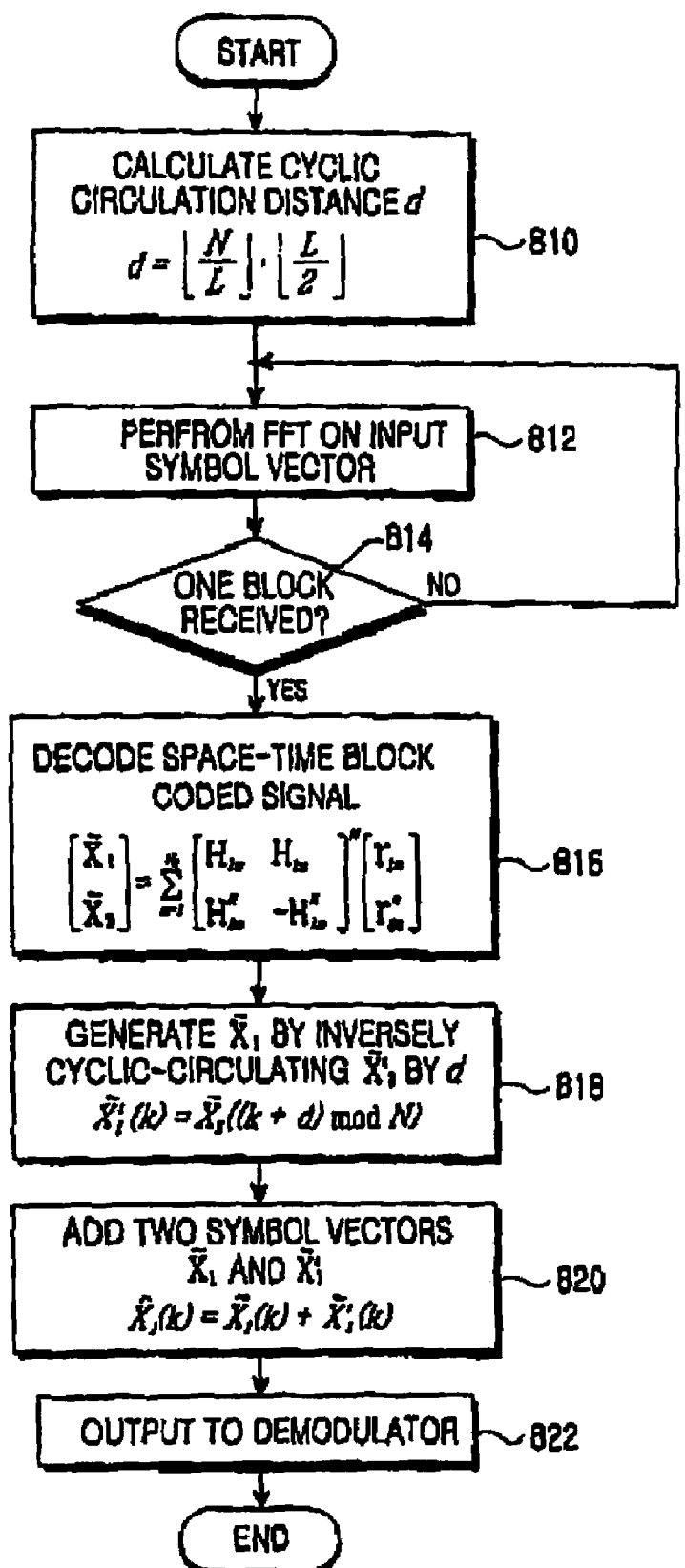
FIG. 8 illustrates an operation of a receiver according to an embodiment of the present invention.

Therefore, signals decoded by the space-time block code decoder 422 in step 816 of FIG. 8 are obtained by multiplying the symbol vector by Hermitian of a channel matrix $\overline{H}$ due to orthogonality of a space-time block code, as follows $$\tilde{X} = \begin{bmatrix} \tilde{X}_1 \\ \tilde{X}_2 \end{bmatrix} = \overline{H}^H \cdot \bar{r} \quad \text{Equation (23)}$$

$$= \begin{bmatrix} H_1^*H_1 + H_2^*H_2 & 0 \\ 0 & H_1^*H_1 + H_2^*H_2 \end{bmatrix}\begin{bmatrix} X_1 \\ X_2 \end{bmatrix} + \overline{H}^H \cdot \bar{n}$$

Among decoded symbol vectors $\tilde{X}_1$ and $\tilde{X}_2$ of Equation (23), the $\tilde{X}_2$ is generated by cyclically-circulating the $\tilde{X}_1$, so an inverse cyclic circulator 612 of FIG. 6 inversely cyclically-circulates, in step 818 of FIG. 8, the $\tilde{X}_2$ by the cyclic circulation distance d in a reverse operation of the cyclic circulation performed by the transmitter. For the inverse cyclic circulation operation, it is necessary to determine an inverse cyclic circulation distance d. The inverse cyclic circulation distance d is calculated by a cyclic circulation distance determiner 616 in step 810 of FIG. 8. Each subcarrier of the symbol $\tilde{X}_1'$ generated by inverse cyclic circulation is represented by $$\tilde{X}_1'(k) = \tilde{X}_2((k+d) \bmod N), \quad 0 \leq k \leq N-1$$

$$\tilde{X}_1' = [\tilde{X}_2(d) \ldots \tilde{X}_2(N-1)\tilde{X}_2(0) \ldots \tilde{X}_2(d-1)]^T \quad \text{Equation (24)}$$

Therefore, the $\tilde{X}_1'$ from which a noise component is eliminated by Equation (23), can be expressed as an actually transmitted OFDM symbol s by inverse cyclic circulation in accordance with Equation (25) below.

$$\tilde{X}_1 = \quad \text{Equation (25)}$$

$$\begin{bmatrix} |H_1(d)|^2 + |H_2(d)|^2 & 0 & \cdots & \cdots & \cdots & 0 \\ 0 & \ddots & \vdots & \vdots & \vdots & \vdots \\ \vdots & 0 & |H_1(N-1)|^2 + |H_2(N-1)|^2 & 0 & \cdots & 0 \\ 0 & \cdots & 0 & |H_1(0)|^2 + |H_2(0)|^2 & \cdots & 0 \\ 0 & \cdots & 0 & \ddots & \ddots & 0 \\ 0 & \cdots & \cdots & \cdots & 0 & |H_1(d-1)|^2 + |H_2(d-1)|^2 \end{bmatrix} \begin{bmatrix} s(0) \\ \vdots \\ s(N-d-1) \\ s(N-d) \\ \vdots \\ s(N-1) \end{bmatrix}$$

Since the $\tilde{X}_1$ and the $\tilde{X}_1'$ have the same transmission symbol vector s, a $k^{th}$ subcarrier of a symbol vector $\hat{X}_1$, or the sum of the two vectors, is represented by $$\hat{X}_1(k) = (|H_1(k)|^2 + |H_2(k)|^2 + |H_1((k+d) \bmod N)|^2 + |H_2((k+d) \bmod N)|^2)s(k) = \lambda_k \cdot s(k) \text{ for } 0 \leq k \leq N-1 \quad \text{Equation (26)}$$

The $\tilde{X}_1$ and the $\tilde{X}_1'$ are added by an adder 614 of FIG. 6 in step 820 of FIG. 8.

Generally, in a mobile communication system using multiple antennas, channels between the transmission antennas are independent of each other. Therefore, $H_1$ and $H_2$ are independent of each other. Thus, in Equation (26), $H_1(k)$ is independent of $H_2(k)$, and $H_1((k+d) \bmod N$ is independent of $H_2((k+d) \bmod N$. Further, in Equation (17), the cyclic circulation distance d is determined such that channels between subcarriers are independent of each other, so $H_1(k)$ is also independent of $H_1((k+d) \bmod N$, and $H_2(k)$ is also independent of $H_2((k+d) \bmod N$. Therefore, it is noted in Equation (26) that a transmission signal s(k) obtains a second-order space diversity gain and a second-order frequency diversity gain, i.e., obtains a total of a fourth-order diversity gain.

Therefore, with only two transmission antennas, the transmitter guarantees the performance obtained using four transmission antennas in an OFDM mobile communication system using a space-time block code. After a process of decoding a space-time block code by the space-time block code decoder 422, an output signal of a frequency diversity combiner 424 is provided to a demodulator (or QPSK/QAM demapper) 426 in step 822 of FIG. 8, for demodulation. The demodulation by the demodulator 426 is performed in accordance with Equation (27) below.

$$\hat{s}(k) = \arg_{\hat{s}(k)}^{min} \|\hat{X}_1 - \lambda_k \cdot \hat{s}(k)\|^2, \quad 0 \leq k \leq N-1 \quad \text{Equation (27)}$$

2) $N_R$ Reception Antennas Used

A receiver decodes signals received through the respective reception antennas in the space-time block code decoding method, and then sums the decoded signals for each antenna. This can be expressed as $$\tilde{X} = \begin{bmatrix} \tilde{X}_1 \\ \tilde{X}_2 \end{bmatrix} = \sum_{m=1}^{N_R} \begin{bmatrix} H_{1m} & H_{2m} \\ H_{2m}^* & -H_{1m}^* \end{bmatrix} \begin{bmatrix} r_{1m} \\ r_{2m}^* \end{bmatrix} \quad \text{Equation (28)}$$

$$= \sum_{m=1}^{N_R} \overline{H}_m^H \overline{H}_m \overline{X} + \overline{H}_m^H \overline{n}_m$$

In Equation (28), $H_{1m}$ and $H_{2m}$ represent a frequency response of a channel between a first antenna and an $m^{th}$ antenna, and a frequency response of a channel between a second antenna and an $m^{th}$ antenna, respectively. Therefore, in Equation (28), a signal decoded by a space-time block code is equal to a valued determined by summing Equation (23) $N_R$ times. Since channels among the reception antennas are independent of one another, a space diversity gain becomes $2N_R$.

Next, the frequency diversity is determined in the same process as when the number of the reception antennas is 1. Therefore, when the number of reception antennas is $N_R$, an STFBC using two transmission antennas obtains a diversity gain of $2 \times 2N_R$.

Figure 11:
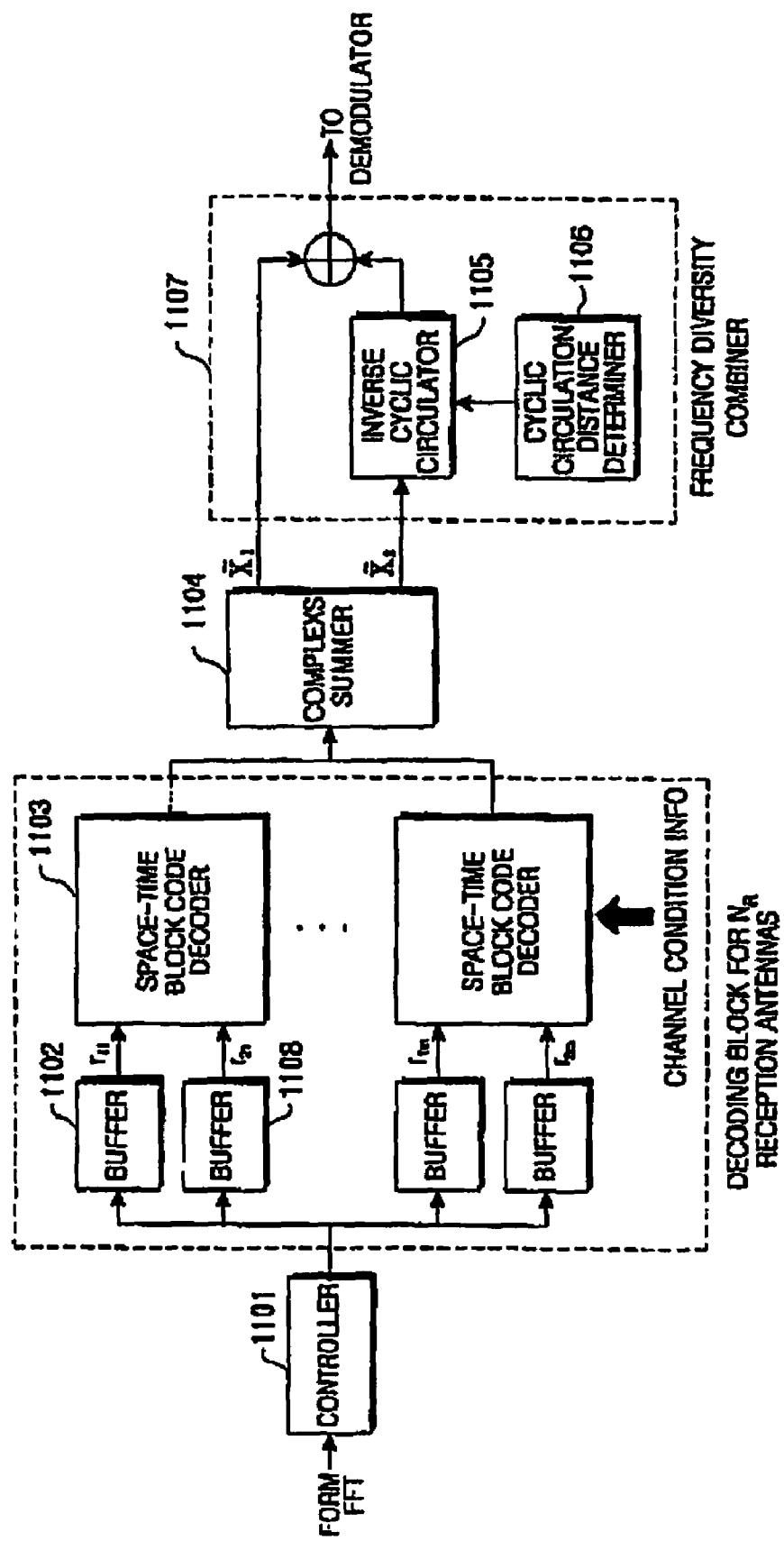
FIG. 11 illustrates a receiver for performing decoding on $N_R$ reception antennas according to an embodiment of the present invention.

FIG. 11 illustrates a receiver for performing decoding on $N_R$ reception antennas according to an embodiment of the present invention. Referring to FIG. 11, a controller 1101 separates a symbol decoded by a space-time block code, provided from FFT blocks 418 and 420 of FIG. 4, according to paths of the multipath channel and reception time axes, and distributes the separated symbols to corresponding buffers 1102. The symbols distributed by the controller 1101 are provided to the corresponding buffers 1102, and when the symbols are stored as much as a predetermined amount, the buffers 1102 provide the symbols stored therein to a corresponding space-time block code decoder 1103. The output signals of the buffers are represented by $r_{11}, r_{21}, \ldots, r_{1m}, r_{2m}$, respectively. Among subscripts of each output symbol, a preceding numeral indicates a timing index and a following numeral indicates an index designating a multipath channel. The receiver includes as many space-time block code decoders 1103 as the number $N_R$ of the reception antennas. The modulated symbols output from the space-time block code decoders 1103 are provided to a complex summer 1104, where they are summed into one modulated symbol. The succeeding operation of processing the modulated symbol output from the complex summer 1104 is performed in the same way as when there is one reception antenna.

As described above, with only one or two transmission antennas, the STTD coding/decoding apparatus and method according to the present invention can have the same performance as the conventional apparatus and method using two or four transmission antennas. The present invention provides a transmission diversity technique for making the utmost use of frequency diversity as well as space diversity, thereby obtaining a second-order or fourth-order diversity gain with only 1 or two transmission antennas. Therefore, it is possible to improve system performance with a linear operation such as simple cyclic circulation, without an increase in complexity due to the increase in number of transmission antennas. In addition, since the invention is fully compatible with the existing OFDM mobile communication system using a space-time block code, it is possible to improve system performance while fully utilizing the existing mobile communication system. Further, in a channel environment in which a correlation between antennas is relatively high, the present invention shows more performance improvement, compared with the existing mobile communication system. In addition, even when the channels have non-uniform power delay profiles, the receiver estimates a cyclic circulation distance based on a correlation through transmission channel estimation and feeds back the estimated cyclic circulation distance to the transmitter. Therefore, even in a non-ideal environment, i.e., in a general wireless channel environment, it is possible to maximize the space diversity and frequency diversity effects. Accordingly, the present invention will be used to improve performance of the future mobile communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A data transmission apparatus for in an OFDM (Orthogonal Frequency Division Multiplexing) system, the apparatus comprising:
   a first transmission antenna;
   a second transmission antenna; and
   an OFDM symbol generator for transforming input data into a first OFDM symbol and mapping the first OFDM symbol to be transmitted through the first transmission antenna, and transforming the input data into a cyclic-circulated second OFDM symbol and mapping the second OFDM symbol to be transmitted through the second transmission antenna.

2. The transmission apparatus of claim 1, wherein the OFDM symbol generator comprises:
   an IFFT (Inverse Fast Fourier Transform) block for transforming the input data into a time domain OFDM symbol; and
   a cyclic circulator for cyclic-circulating the input data.

3. The transmission apparatus of claim 1, wherein the OFDM symbol generator comprises:
   a cyclic circulator for generating the second OFDM symbol by cyclic-circulating the input data to a frequency domain.

4. The transmission apparatus of claim 3, wherein the OFDM symbol generator further comprises:
   a cyclic circulation distance determiner for determining a cyclic circulation distance of a phase of the input data and outputting the determined cyclic circulation distance to the cyclic circulator.

5. The transmission apparatus of claim 4, wherein the cyclic circulation distance determiner determines the cyclic circulation distance in accordance with $$d = \left\lfloor \frac{N}{L} \right\rfloor \cdot \left\lfloor \frac{L}{2} \right\rfloor$$

where d denotes the cyclic circulation distance, N denotes the total number of the subcarriers including in one of the first OFDM symbols and the second OFDM symbol, and L denotes the number of multiple paths.

6. The transmission apparatus of claim 4, wherein the OFDM symbol generator further comprises:
a counter for counting the determined cyclic circulation distance.

7. The transmission apparatus of claim 4, wherein the cyclic circulation distance determiner determines the cyclic circulation distance on a basis of a position value of a subcarrier having a minimum correlation with a first subcarrier among the subcarriers of the first OFDM symbol and the second OFDM symbol.

8. The transmission apparatus of claim 1, wherein the OFDM symbol generator further comprises:
a STFBC (Space-Time Frequency Block Code) coding block for respectively encoding the input data and the cyclic-circulated input data by a STBC (Space-Time Block Code).

9. The transmission apparatus of claim 8, wherein the OFDM symbol generator further comprises:
an IFFT (Inverse Fast Fourier Transform) block for transforming the STBC coded input data and the cyclic-circulated input data into respective time domain symbols.

10. The transmission apparatus of claim 1, wherein the OFDM symbol generator further comprises:
an IFFT (Inverse Fast Fourier Transform) block for transforming the input data and the cyclic-circulated input data into respective a time domain symbols.

11. A data transmission method in an OFDM (Orthogonal Frequency Division Multiplexing) system, the method comprising the steps of:
(a) transforming input data into a first OFDM symbol;
(b) transforming a second OFDM symbol by cyclic-circulating the input data and;
(c) mapping the first OFDM symbol to be transmitted through a first transmission antenna and mapping the second OFDM symbol to be transmitted through a second transmission antenna.

12. The transmission method of claim 11, wherein step (b) comprises:
cyclic-circulating the input data in frequency domain; and
transforming the input data into a time domain signal by performing IFFT (Inverse Fast Fourier Transform) on the cyclic-circulated signal.

13. The transmission method of claim 12, wherein the step of cyclic-circulating the input data comprises:
determining the cyclic circulation distance of the input for phase-circulation.

14. The transmission method of claim 13, wherein the step of cyclic-circulating the input data comprises the step of determining the cyclic circulation distance in accordance with the following Equation:

$$d = \left\lfloor \frac{N}{L} \right\rfloor \cdot \left\lfloor \frac{L}{2} \right\rfloor$$

where, d denotes the cyclic circulation distance, N denotes the total number of the subcarriers including in one of the first OFDM symbols and the second OFDM symbol, and L denotes the number of multiple paths;
cyclic-circulating the input data based on the determined cyclic circulation distance.

15. The transmission method of claim 13, wherein the step of cyclic-circulating the input data comprises the step of counting the determined cyclic circulation distance.

16. The transmission method of claim 13, wherein the cyclic circulation distance is determined by the cyclic circulation distance based on a position value of a subcarrier having a minimum correlation with a first subcarrier among the subcarriers of the first OFDM symbol and the second OFDM symbol.

17. The transmission method of claim 12, wherein the step of cyclic-circulating the input data comprises respectively encoding the input data and the cyclic-circulated input data by a space-time block code.

18. The transmission method of claim 11, wherein step (a) comprises:
encoding the input data by a STFBC (Space-Time Frequency Block Code).

19. The transmission method of claim 18, wherein step (a) further comprises:
transforming symbols of a time domain by performing IFFT on the STFBC encoded input data.

* * * * *